United States Patent
Okazaki et al.

(10) Patent No.: US 9,604,410 B2
(45) Date of Patent: Mar. 28, 2017

(54) THREE DIMENSIONAL PRINTER

(71) Applicant: Sodick, Co., Ltd., Kanagawa (JP)

(72) Inventors: Shuji Okazaki, Kanagawa (JP);
Shuichi Kawada, Kanagawa (JP);
Katsutaka Muranaka, Kanagawa (JP)

(73) Assignee: Sodick Co., Ltd., Kanagawa (JP)

(*) Notice: Subject to any disclaimer, the term of this patent is extended or adjusted under 35 U.S.C. 154(b) by 94 days.

(21) Appl. No.: 14/723,018

(22) Filed: May 27, 2015

(65) Prior Publication Data

US 2015/0367573 A1 Dec. 24, 2015

(30) Foreign Application Priority Data

Jun. 20, 2014 (JP) ................................. 2014-127331

(51) Int. Cl.
*B29C 67/00* (2006.01)
*B33Y 30/00* (2015.01)

(52) U.S. Cl.
CPC ........... *B29C 67/0077* (2013.01); *B33Y 30/00* (2014.12)

(58) Field of Classification Search
CPC ............ B29C 67/0077; B29C 67/0081; B29C 67/0085; B33Y 30/00; B22F 2003/1056; B22F 3/1055
See application file for complete search history.

(56) References Cited

U.S. PATENT DOCUMENTS

| | | | | |
|---|---|---|---|---|
| 6,583,379 B1* | 6/2003 | Meiners | ................ | B22F 3/1055 219/121.6 |
| 6,764,636 B1* | 7/2004 | Allanic | ................... | B29C 41/12 118/100 |
| 2001/0050448 A1* | 12/2001 | Kubo | ................... | B29C 67/0077 264/308 |
| 2002/0179582 A1* | 12/2002 | Reichmann | ........ | B23K 26/0665 219/121.84 |
| 2010/0006228 A1* | 1/2010 | Abe | ..................... | B29C 67/0077 156/356 |
| 2011/0120981 A1* | 5/2011 | Paganelli | ........... | B23K 26/0823 219/121.67 |
| 2012/0118705 A1* | 5/2012 | Grzesiak | ............... | B22F 3/1055 198/617 |
| 2012/0126457 A1* | 5/2012 | Abe | ...................... | B22F 3/1055 264/460 |
| 2012/0251378 A1* | 10/2012 | Abe | .................... | B29C 67/0077 419/55 |
| 2013/0064706 A1* | 3/2013 | Schwarze | ............. | B22F 3/1055 419/1 |

(Continued)

FOREIGN PATENT DOCUMENTS

JP 2006-124732 A 5/2006
JP 2008-184623 A 8/2008

(Continued)

OTHER PUBLICATIONS

Chinese Office Action dated Dec. 28, 2016, in connection with corresponding Chinese Application No. 201510345477.8 (9 pgs., including English translation).

*Primary Examiner* — Alison L Hindenlang
*Assistant Examiner* — Jerzi H Moreno Hernandez
(74) *Attorney, Agent, or Firm* — Maier & Maier, PLLC

(57) ABSTRACT

An improved lamination molding apparatus which can remove the fume swiftly and efficiently away from the optical pathway of the laser beam, is provided.

5 Claims, 8 Drawing Sheets

(56) References Cited

U.S. PATENT DOCUMENTS

| | | | |
|---|---|---|---|
| 2014/0175708 A1* | 6/2014 | Echigo | B29C 67/0077 264/460 |
| 2015/0060422 A1* | 3/2015 | Liebl | B23K 26/08 219/121.78 |
| 2015/0283611 A1* | 10/2015 | Takezawa | B22F 3/1055 425/78 |
| 2015/0298211 A1* | 10/2015 | Abe | B29C 67/0077 419/28 |

FOREIGN PATENT DOCUMENTS

| | | |
|---|---|---|
| JP | 2008-240075 A | 10/2008 |
| JP | 2009-078558 A | 4/2009 |
| JP | 2010-132961 B2 | 6/2010 |
| JP | 2010-265521 A | 11/2010 |
| WO | 2011-049143 A1 | 4/2011 |

* cited by examiner

THREE DIMENSIONAL PRINTER

BACKGROUND OF THE INVENTION

Field of the Invention

The present invention relates to a lamination molding device.

Background of the Invention

In a powder sintering/laminating method (laser lithography) of metal using laser beam, a particular smoke known as fume is generated when the metal material powder is irradiated with laser beam for sintering.

Current laser lithography apparatus (sintering lamination molding apparatus) for molding metal products is generally operated by supplying the material powder in a chamber filled with inert gas (usually nitrogen gas), followed by irradiation of the material powder with the laser beam.

When the chamber gets filled with fume, the fume may shield the laser beam, and the laser beam with necessary energy may not reach the sintering portion. Therefore, clean inert gas is continuously supplied into the chamber while the contaminated inert gas is exhausted out of the chamber (Patent Literature 1).

The fume is generated at the sintering portion, and then rises so as to cover the periphery of the sintering portion. Here, the sintering portion is irradiated with the laser beam which is generally provided from substantially the upper side in vertical direction. In such case, the fume gets in the optical pathway of the laser beam. Therefore, the fume may not be removed sufficiently when the inert gas in the chamber is merely circulated. Accordingly, a method for exhausting the inert gas in the chamber by leading the fume away from the optical pathway by utilizing the supplying opening and the exhausting opening of the inert gas has been suggested (Patent Literature 2).

PRIOR ART DOCUMENTS

Patent Literature

[Patent Literature 1] JP 5243935B
[Patent Literature 2] WO 2011/49143

SUMMARY OF INVENTION

Technical Problem

However, there were cases where the fume was not removed sufficiently even with the methods disclosed in Patent Literatures 1 and 2. Here, it is necessary to remove the fume more swiftly and efficiently away from the optical pathway of the laser beam.

The present invention has been made by taking these circumstances into consideration. An object of the present invention is to provide an improved lamination molding apparatus which can remove the fume swiftly and efficiently away from the optical pathway of the laser beam.

Means to Solve the Problem

According to the present invention, a lamination molding apparatus, comprising a chamber covering a desired molding region and being filled with an inert gas of predetermined concentration; a recoater head capable of moving in a first horizontal uniaxial direction so as to supply a material powder in the molding region of the chamber and planarize the material powder supplied; and a fume suction opening provided on both sides of the recoater head along a second horizontal uniaxial direction crossing orthogonally with the first horizontal uniaxial direction, is provided.

Effect of the Invention

In the present invention, the fume suction opening is provided on both sides of the recoater head along a direction crossing orthogonally with the moving direction of the recoater head which supplies the material powder and planarize the supplied material powder. Here, the fume can be suctioned from the fume suction opening when the recoater head is moved. According to such constitution, the fume generated at the molding region can be suctioned when the recoater head passes the molding region. Therefore, the fume can be suctioned swiftly and effectively.

Hereinafter, various embodiments of the present invention will be provided. The embodiments provided below can be combined with each other.

Preferably, the lamination molding apparatus further comprises an inert gas supplying opening and an inert gas discharging opening provided on both sides of the molding region along the first horizontal uniaxial direction.

Preferably, the fume suction opening suctions the fume generated in the molding region from the first horizontal uniaxial direction.

Preferably, the recoater head is structured so as to be capable of suction the fume while planarizing the material powder.

BRIEF DESCRIPTION OF THE DRAWINGS

The above further objects, features and advantages of the present invention will become more apparent from the following detailed description taken in conjunction with the accompanying drawings, wherein.

DESCRIPTION OF THE PREFERRED EMBODIMENTS

Hereinafter, the embodiments of the present invention will be described with reference to the drawings. Here, the characteristic matters shown in the embodiments can be combined with each other.

Figure 1:
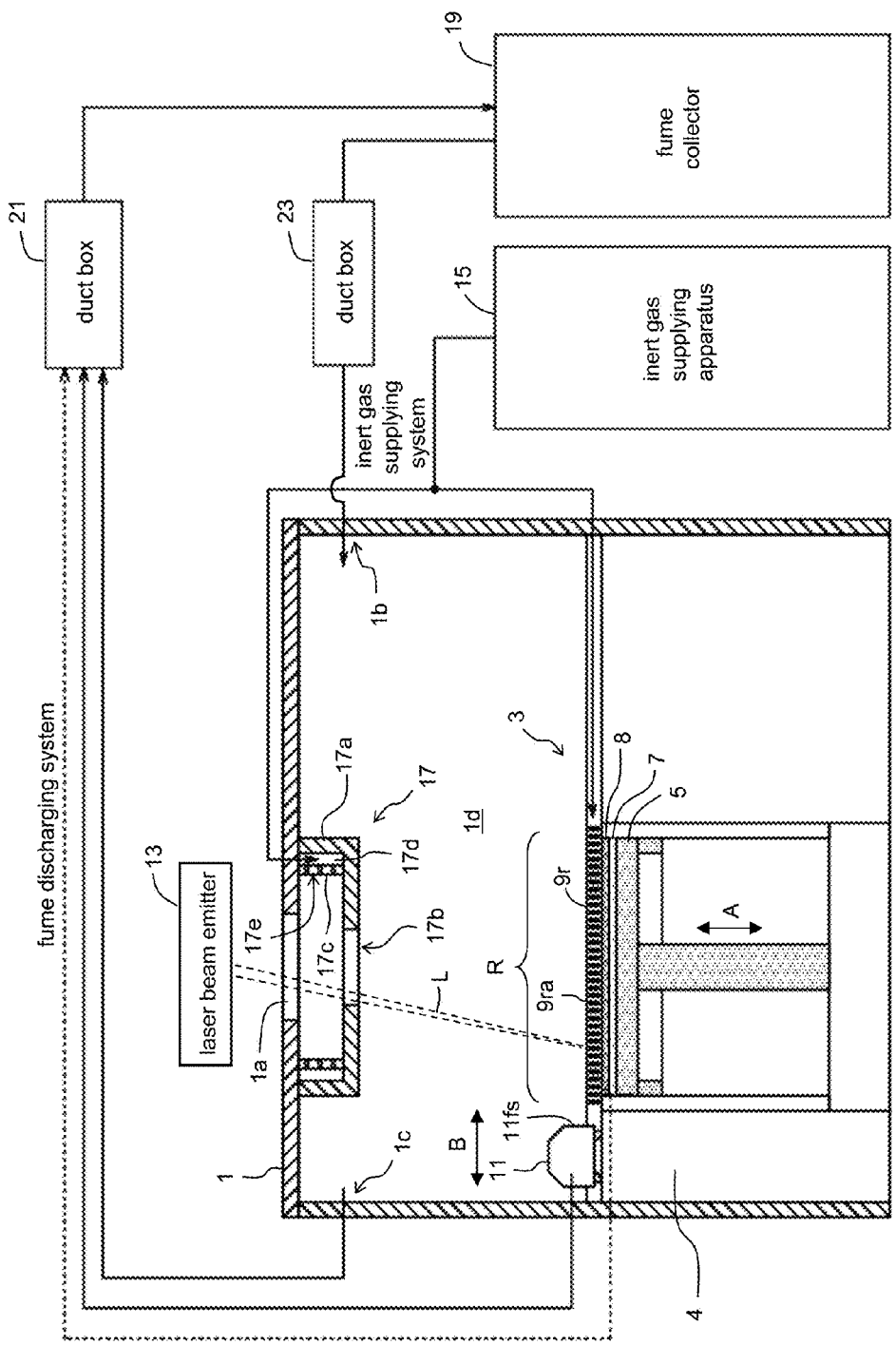
FIG. 1 is a structural diagram of the lamination molding apparatus according to one embodiment of the present invention.
Figure 2:
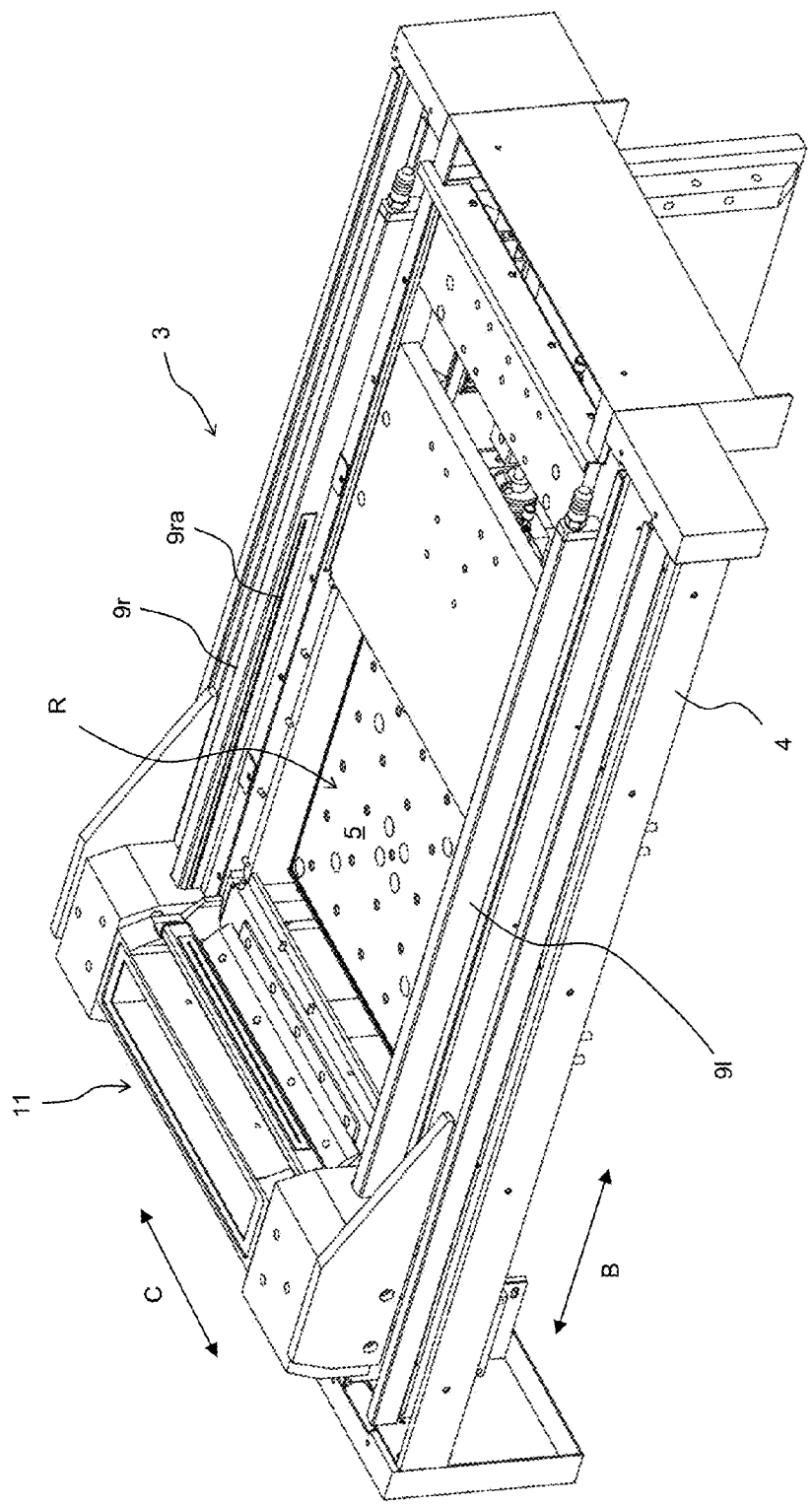
FIG. 2 is a perspective view of a powder layer forming apparatus 3.

As shown in FIGS. 1 and 2, the lamination molding apparatus according to one embodiment of the present invention is structured by providing the powder layer forming apparatus 3 in the chamber 1. The powder layer forming apparatus 3 comprises a base 4 having a molding region R, a recoater head 11 provided on the base 4 and being capable of moving in a horizontal uniaxial direction (direction shown by arrow B), and elongated members 9r and 9l provided on both sides of the molding region R along the moving direction of the recoater head 11. The molding region R is provided with a molding table 5 capable of moving vertically (direction shown by arrow A in FIG. 1). When the lamination molding apparatus is used, the molding plate 7 is arranged on the molding table 5, and the material powder layer 8 is formed thereon.

Figure 3:
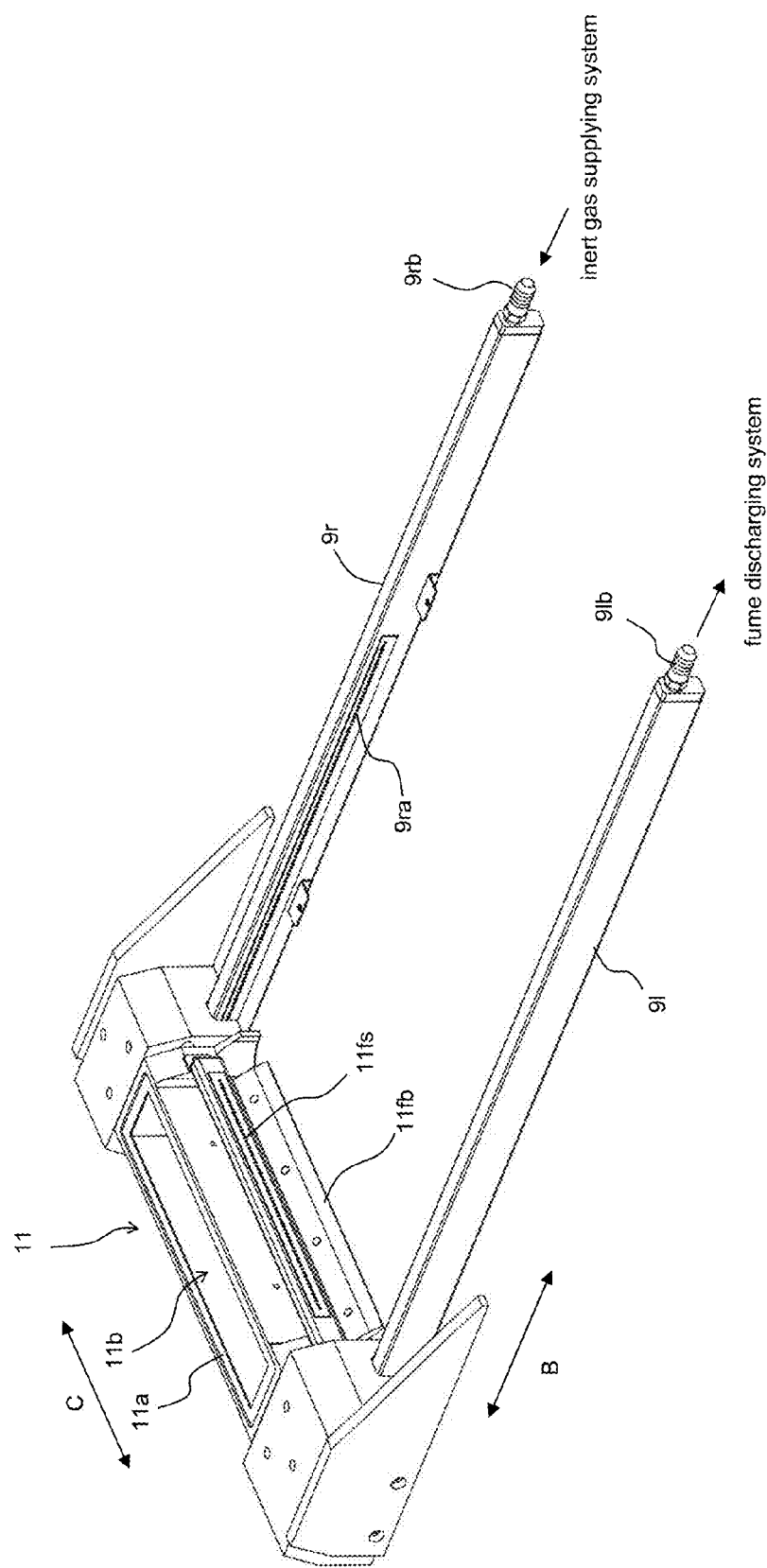
FIG. 3 is a perspective view of the recoater head 11 and elongated members 9r and 9l.
Figure 4:
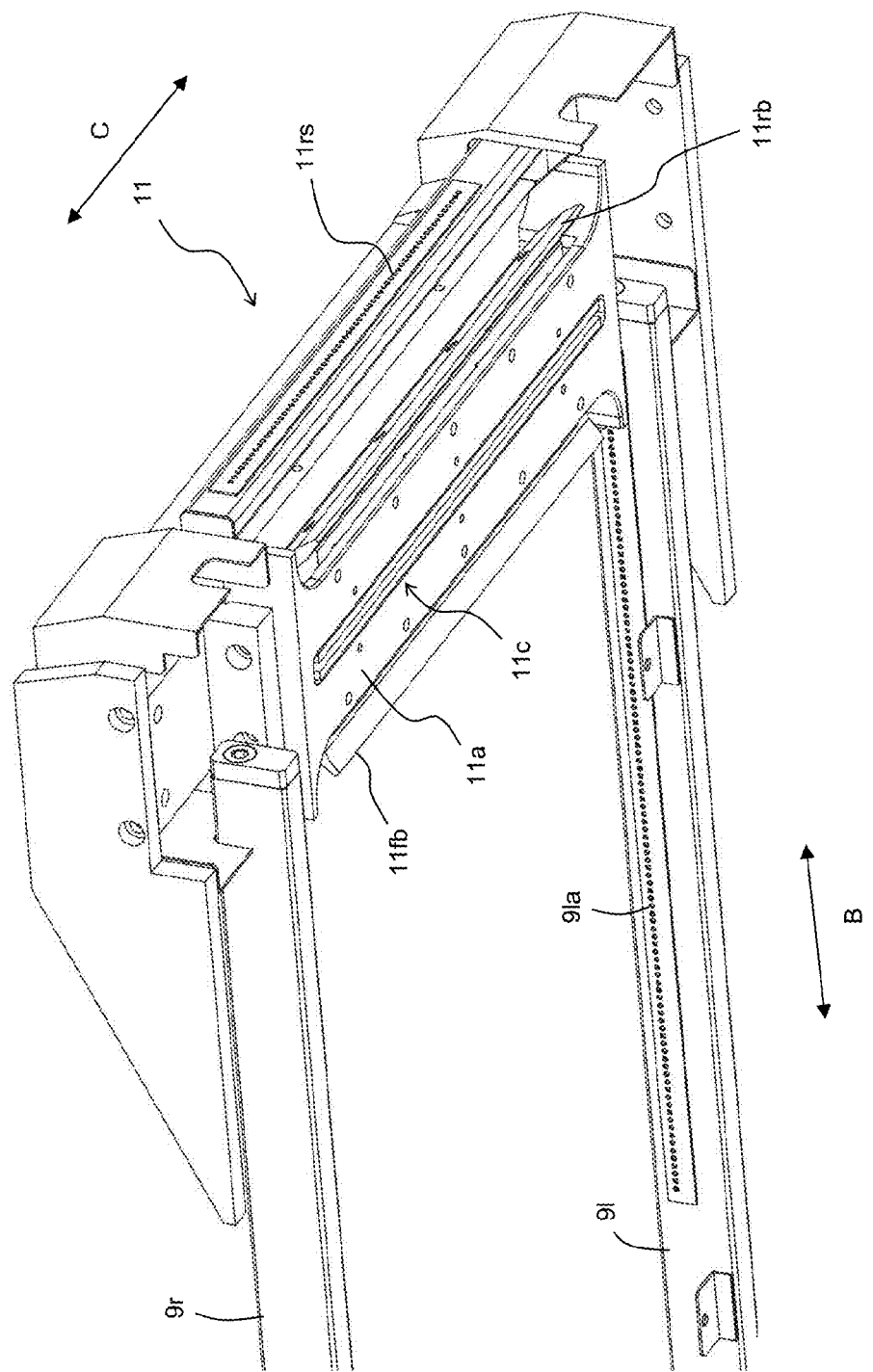
FIG. 4 is a perspective view of the recoater head 11 and the elongated members 9r and 9l seen from another angle.

As shown in FIGS. 3 and 4, the recoater head 11 comprises a material holding section 11a, a material supplying section 11b provided on the top surface of the material holding section 11a, and a material discharging section 11c provided on the bottom surface of the material holding section 11a for discharging the material powder contained in the material holding section 11a. The material discharging section 11c has a slit shape which elongates in the horizontal uniaxial direction (direction shown by arrow C) crossing orthogonally with the moving direction (direction shown by arrow B) of the recoater head 11. On both sides of the recoater head 11, squeegee blades 11fb and 11rb for forming a material powder layer 8 by planarizing the material powder discharged from the material discharging section 11c are provided. In addition, on both sides of the recoater head 11, fume suction sections 11fs and 11rs for suctioning the fume generated during sintering of the material powder are provided. The fume suction sections 11fs and 11rs are provided along the horizontal uniaxial direction (direction shown by arrow C) crossing orthogonally with the moving direction (direction shown by arrow B) of the recoater head 11. The material powder is, for example, metal powder (iron powder for example) having a sphere shape with an average particle diameter of 20 μm.

The elongated members 9r and 9l are provided with openings 9ra and 9la, respectively. Here, the openings 9ra and 9la are provided along the moving direction (direction shown by arrow B) of the recoater head 11. In the present embodiment, the opening 9ra is used as the inert gas supplying opening, and the opening 9la is used as the inert gas discharging opening. Since the inert gas is supplied from the opening 9ra and is discharged from the opening 9la, a flow of inert gas can be made in the direction shown by the arrow C on the molding region R. Accordingly, the fume generated in the molding region R can be easily discharged along this flow of the inert gas. Here, in the present specification, "inert gas" is a gas which substantially does not react with the material powder, and nitrogen gas, argon gas, and helium gas can be mentioned for example. Here, the opening 9la can be used as the inert gas supplying opening, and the opening 9ra can be used as the inert gas discharging opening.

A laser beam emitter 13 is provided above the chamber 1. The material powder layer 8 formed in the molding region R is irradiated with the laser beam L emitted from the laser beam emitter 13 which is transmitted through a window 1a provided in the chamber 1. The laser beam emitter 13 need be structured so as to allow two-dimensional scanning of the laser beam L. For example, the laser beam emitter 13 is structured with a laser beam source for generating the laser beam L, and a pair of galvanometer scanner for allowing two-dimensional scanning of the laser beam L in the molding region R. There is no particular limitation to the type of the laser beam L, so long as it can sinter the material powder. For example, $CO_2$ laser, fiber laser, and YAG laser can be mentioned. The window 1a is formed with a material which can transmit the laser beam L. For example, in a case where the laser beam L is a fiber laser or a YAG laser, the window 1a can be structured with quartz glass.

Figure 5:
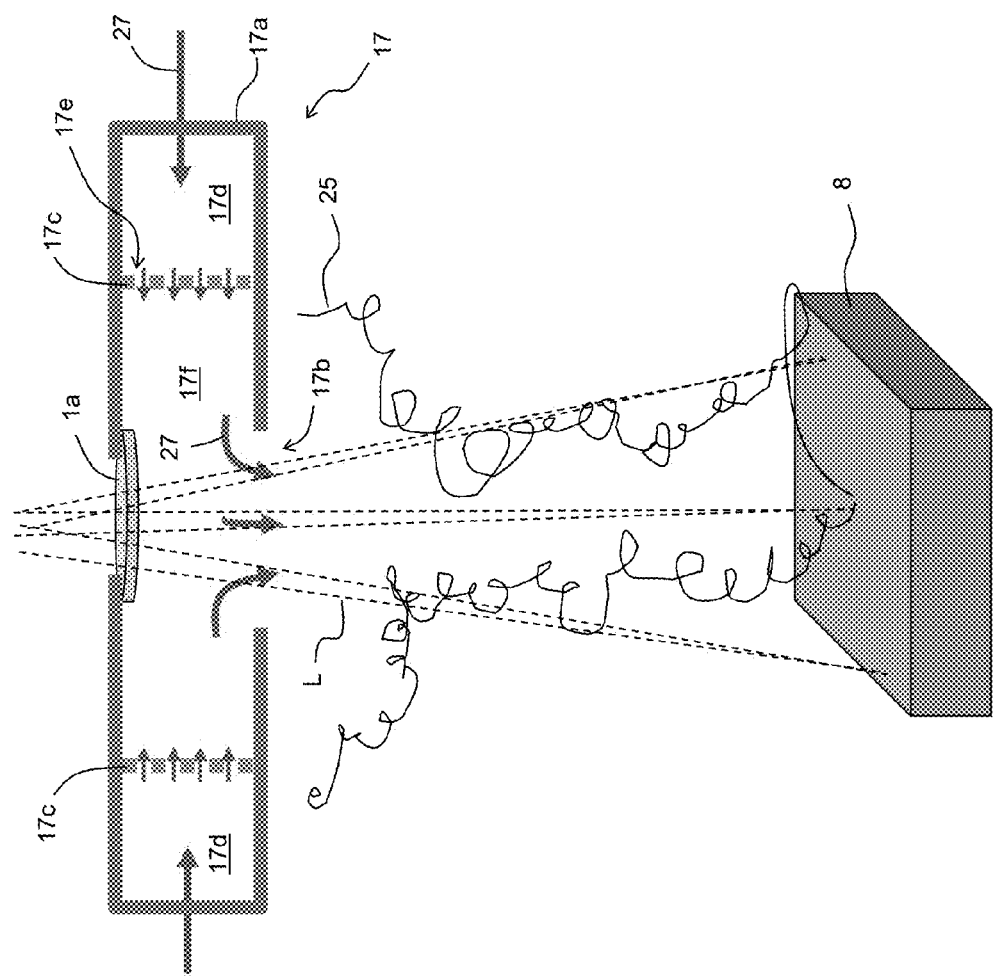
FIG. 5 is a structural diagram showing the details of the fume diffusing section 17.
Figure 6:
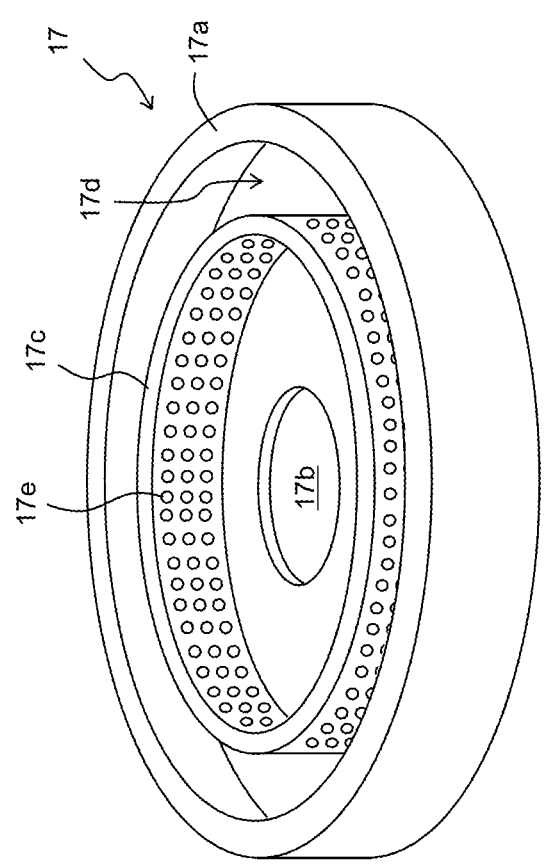
FIG. 6 is a perspective view of the fume diffusing section 17.

On the upper surface of the chamber 1, the fume diffusing section 17 is provided so as to cover the window 1a. As shown in FIGS. 5 to 6, the fume diffusing section 17 is provided with a cylindrical housing 17a and a cylindrical diffusing member 17c arranged in the housing 17a. An inert gas supplying space 17d is provided in between the housing 17a and the diffusing member 17c. Further, on the bottom surface of the housing 17a, an opening 17b is provided at the inner portion of the diffusing member 17c. The diffusing member 17c is provided with a plurality of pores 17e, and the clean inert gas supplied into the inert gas supplying space 17d is filled into a clean space 17f through the pores 17e. Then, the clean inert gas 27 filled in the clean space 17f is discharged towards below the fume diffusing section 17 through the opening 17b. The clean inert gas 27 discharged from the opening 17b forms a streamline flow along the optical pathway of the laser beam L (nearly coaxially with the optical pathway of the laser beam L), thereby removing the fume 25 from the optical pathway of the laser beam L. According to such structure, even when fume 25 is generated by irradiating the material powder layer 8 with the laser beam L, the fume 25 can be prevented from reaching the window 1a. Therefore, the contamination degree of the window 1a can be suppressed. Here, it is preferable that the opening 17b is formed as small as possible, in order to avoid the fume 25 from entering the clean space 17f. Specifically, the opening 17b is formed with the minimum size which can avoid the laser beam L from being blocked by the housing 17a during the two-dimensional scanning of the laser beam L throughout the entirety of the molding region R.

Next, the inert gas supplying system to supply the inert gas into the chamber 1 and the fume discharging system to discharge the fume from the chamber 1 are explained.

The inert gas supplying system to supply the inert gas into the chamber 1 is connected with the inert gas supplying apparatus 15 and the fume collector 19. The inert gas supplying apparatus 15 has a function to supply the inert gas, and is a gas cylinder containing inert gas, for example. The fume collector 19 comprises duct boxes 21 and 23 provided at its upper stream side and its lower stream side respectively. The gas discharged from the chamber 1 (inert gas containing fume) is sent to the fume collector 19 through the duct box 21. Then, fume is removed in the fume collector 19, and the cleaned inert gas is sent to the chamber 1 through the fume duct box 23. According to such constitution, the inert gas can be recycled.

As shown in FIGS. 1 and 3, the inert gas supplying system is connected with the upper supplying opening 1b of the chamber 1, the inert gas supplying space 17d of the fume diffusing section 17, and the connecting section 9rb of the elongated member 9r. The inert gas is filled in the molding space 1d of the chamber 1 through the upper supplying opening 1b. The molding space 1d is provided with a temperature sensor and a concentration sensor for the inert gas (both of them not shown), thereby controlling the concentration of the inert gas and the temperature at a prescribed value. In addition, as described above, the inert gas is supplied into the inert gas supplying space 17d so as to form a flow of the inert gas flowing from the clean space 17f towards the molding space 1d. The supply pressure of the inert gas flowing into the inert gas supplying space 17d is preferably slightly higher (for example, by 5 to 10%) than the internal pressure of the molding space 1d, in order to allow easy forming of the flow flowing from the clean space 17f towards the molding space 1d. Here, the inert gas is supplied into the tubular elongated member 9r through the connecting section 9rb, and the inert gas is discharged onto the molding region R through the opening 9ra.

In the present embodiment, the inert gas from the fume collector 19 is sent to the upper supplying opening 1b, and the inert gas from the inert gas supplying apparatus 15 is sent to the inert gas supplying space 17d and the connecting section 9rb. Although there is a possibility that the inert gas from the fume collector 19 contains residual fume, the constitution of the present embodiment does not permit the inert gas from the fume collector 19 be supplied into the space which requires especially high cleanliness (clean space 17f and the space at the periphery of the molding region R). Accordingly, the effect of the residual fume can be minimized. In addition, since the supply pressure of the inert gas from the inert gas supplying apparatus 15 is kept higher than the supply pressure of the inert gas from the fume collector 19, the inert gas from the fume collector can be prevented from reaching the clean space 17f and the periphery of the molding region R. Accordingly, the effect of the residual fume can be suppressed further efficiently.

Here, in a case where the inert gas supplied into the inert gas supplying space 17d and the inert gas supplied into the upper supplying opening 1b are different from each other or have different temperature, the concentration of the inert gas and the temperature in the molding space 1d becomes difficult to control. In the present embodiment, the same inert gas from the inert gas supplying system is divided to supply the inert gas supplying space 17d and the upper supplying opening 1b. Therefore, the type and the temperature of the inert gas discharged from the clean space 17f towards the molding space 1d and the inert gas in the molding space 1d are the same. As a result, the concentration and the temperature of the inert gas in the molding space 1d can be managed easily, and the constitution of the inert gas supplying system becomes simple.

As shown in FIGS. 1, 3, and 4, the fume discharging system to discharge the fume from the chamber 1 is connected with the upper discharging opening 1c of chamber 1, the fume suction sections 11fs and 11rs of the recoater head 11, and the connecting section 9lb of the elongated member 9l. Since the inert gas containing the fume in the molding space 1d of the chamber 1 is discharged through the upper discharging opening 1c, a flow of inert gas flowing from the upper supplying opening 1b towards the upper discharging opening 1c is formed in the molding space 1d. The fume suction sections 11fs and 11rs of the recoater head 11 can suction the fume generated in the molding region R when the recoater head 11 passes over the molding region R. Since the fume can be suctioned at a position very close to the position where the fume is generated, suction of the fume can be performed swiftly and efficiently. In addition, since the fume is suctioned from the direction orthogonal with the optical pathway of the laser beam L, the fume hardly intervene the laser irradiation. Here, the inert gas containing the fume is introduced into the elongated member 9l through the opening 9la, and the inert gas containing the fume is discharged out of the chamber 1 through the connecting section 9lb. The fume discharging system is connected with the fume collector 19 through the dust box 21, and the inert gas after removal of the fume by the fume collector 19 is recycled.

Figure 7:
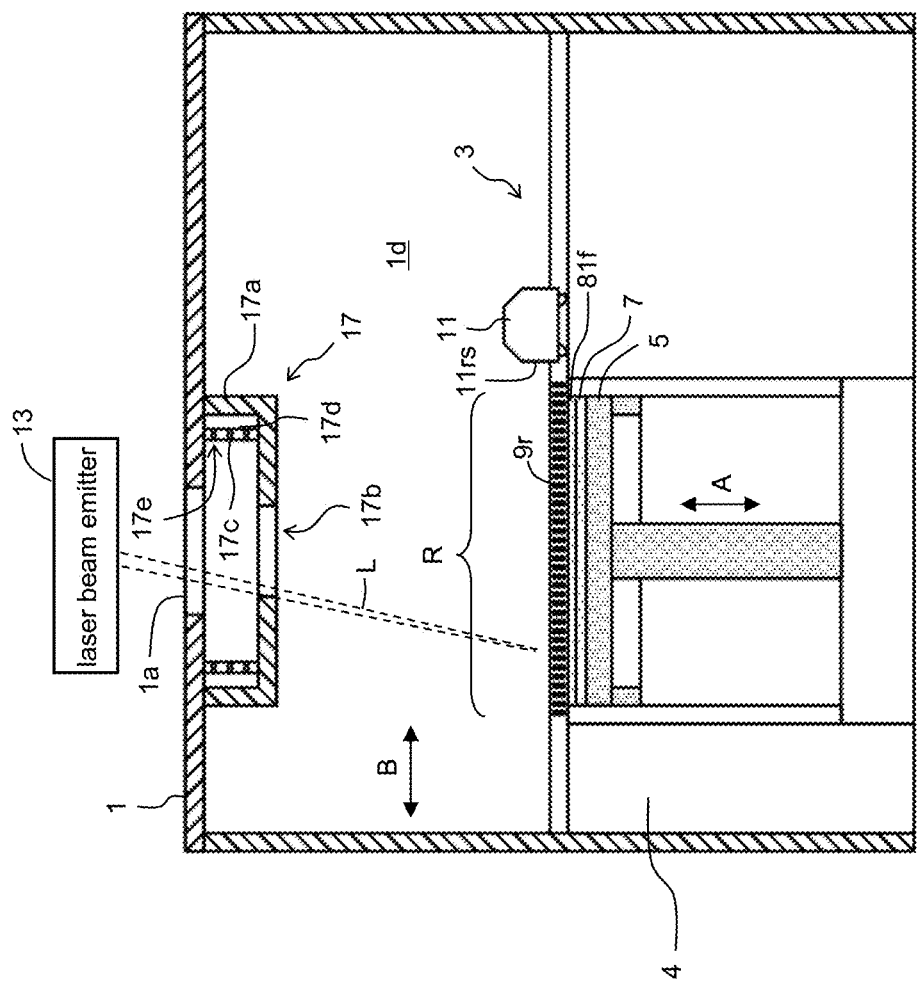
FIG. 7 is an explanatory drawing showing the lamination molding method which uses the lamination molding apparatus according to one embodiment of the present invention.
Figure 8:
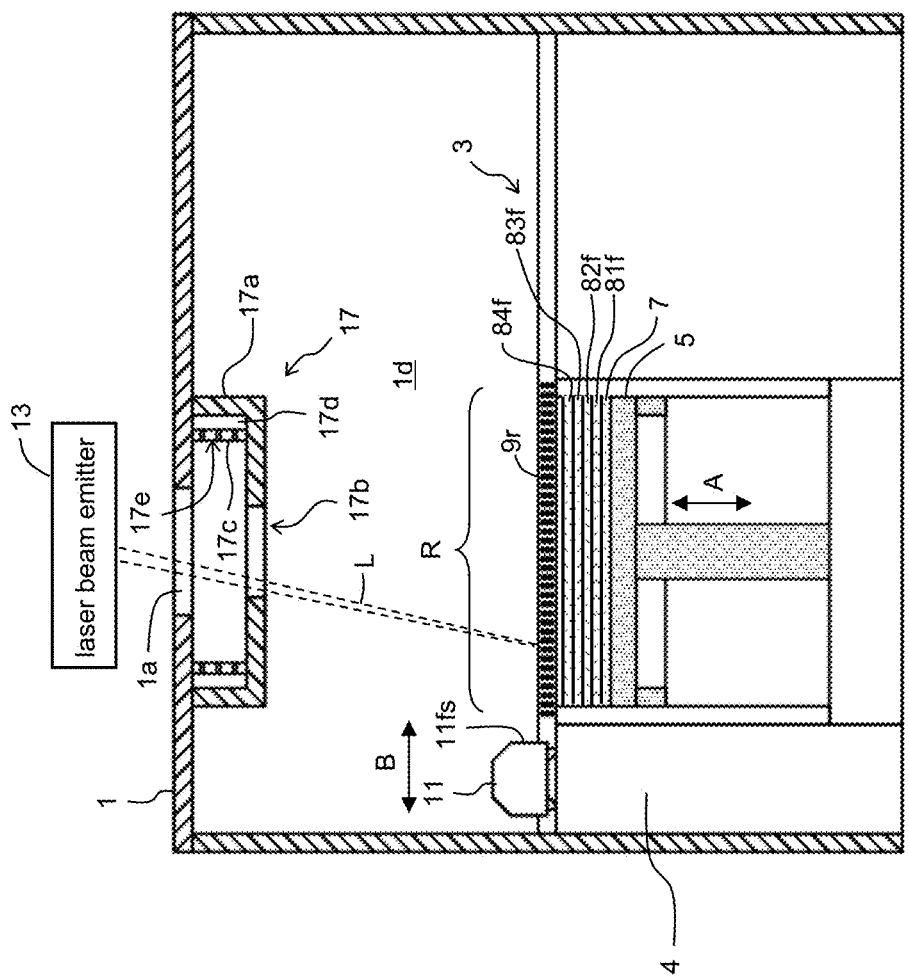
FIG. 8 is an explanatory drawing showing the lamination molding method which uses the lamination molding apparatus according to one embodiment of the present invention.

Next, referring to FIGS. 1, 7, and 8, the lamination molding method using the lamination molding apparatus will be explained. Here, in FIGS. 7 and 8, the inert gas supplying system and the fume discharging system are not shown.

First, the molding plate 7 is placed on the molding table 5, and the height of the molding table 5 is adjusted to an appropriate position. In this state, the recoater head 11 with the material holding section 11a being filled with the material powder is moved from the left side to the right side of the molding region R, in the direction shown by arrow B in FIG. 1. Accordingly, a first layer of the material powder layer 8 is formed on the molding plate 7.

Subsequently, predetermined portion of the material powder layer 8 is irradiated with the laser beam L, thereby sintering the portion of the material powder layer 8 being irradiated with the laser beam. Accordingly, the first layer of sintered layer 81f is obtained as shown in FIG. 7. The fume generated during sintering is mainly suctioned from the fume suction section 11rs provided at the back side (left side in FIG. 7) of the recoater head 11.

Then, the height of the molding table 5 is declined by the thickness of one layer of the material powder layer 8. Subsequently, the recoater head 11 is moved from the right side to the left side of the molding region R. Accordingly, a second layer of the material powder layer 8 is formed on the sintered layer 81f. The fume is suctioned from the fume suction section 11rs during the movement of the recoater head 11. Here, the suction of the fume is performed at a position very close to the position where the fume is generated, and thus it is especially effective. Here, suction of the fume can be performed with the fume suction sections 11fs and 11rs located at both sides. In addition, the fume is suctioned also from the opening 9la.

Next, predetermined portion of the material powder layer 8 is irradiated with the laser beam L, thereby sintering the portion of the material powder layer 8 being irradiated with the laser beam. Accordingly, the second layer of sintered layer 82f is obtained as shown in FIG. 8. The fume generated during sintering is mainly suctioned from the fume suction section 11fs at the front side (right side in FIG. 8) of the recoater head 11.

By repeating these steps, the third layer of sintered layer 83f, the fourth layer of sintered layer 84f, and the sintered layers thereafter are formed. The adjacent sintered layers are firmly fixed with each other.

After forming necessary number of sintered layers, the non-sintered material powder is removed to obtain the molded sintered body. The sintered body can be used as a mold for molding resin for example.

EXPLANATION OF SYMBOLS

1: chamber
3: powder layer forming apparatus
5: forming table
8: material powder layer
11: recoater head
17: fume diffusing section
L: laser beam Although various exemplary embodiments have been shown and described, the invention is not limited to the embodiments shown. Therefore, the scope of the invention is intended to be limited solely by the scope of the claims that follow.

What is claimed is:
1. A lamination molding apparatus, comprising:
a chamber covering a desired molding region and being filled with an inert gas of predetermined concentration;

a recoater head capable of moving in a first horizontal uniaxial direction so as to supply a material powder in the molding region of the chamber and planarize the material powder supplied; and a fume suction opening provided on both sides of the recoater head along a second horizontal uniaxial direction crossing orthogonally with the first horizontal uniaxial direction, wherein the recoater head includes a squeegee blade provided on both sides thereof configured to flat the material powder and to form a material powder layer, and the fume suction opening suctions fume generated in the molding region from the first horizontal uniaxial direction.

2. The lamination molding apparatus of claim 1, further comprising:

an inert gas supplying opening and an inert gas discharging opening provided on both sides of the molding region along the first horizontal uniaxial direction.

3. The lamination molding apparatus of claim 1, wherein:

the recoater head is provided on a base having the molding region; and the fume suction opening is connected out of the chamber.

4. The lamination molding apparatus of claim 1, further comprising:

a laser beam emitter provided above the chamber, including (a) a laser beam source configured to generate laser beam, and (b) a pair of galvanometer scanner configured to allow two-dimensional scanning of the laser beam in the molding region.

5. The lamination molding apparatus of claim 4, further comprising:

a fume diffusing member on an upper surface of the chamber proximate the laser beam emitter configured to receive a supply of the inert gas; and an opening in the fuse diffusing member configured to discharge the inert gas towards the molding region of the chamber so as to form a streamline flow along an optical pathway of the laser beam.

* * * * *